United States Patent [19]

Barrett et al.

[11] Patent Number: 4,906,122
[45] Date of Patent: Mar. 6, 1990

[54] COUPLING FOR MOLECULAR MODELS

[76] Inventors: Edward J. Barrett, 831 Fairfield Beach Rd., Fairfield, Conn. 06430; Yee K. Hui, F-1, 7/F, Honour Bldg., 80R Tokwawan Road, Kowloon, Hong Kong

[21] Appl. No.: 276,928

[22] Filed: Nov. 28, 1988

[51] Int. Cl.[4] .................. G09B 23/00; F16D 1/10; B25G 3/18
[52] U.S. Cl. .................. 403/305; 403/290; 403/303; 403/314; 403/322; 434/278
[58] Field of Search .............. 403/302, 303, 305, 310, 403/314, 322, 330, 290; 434/278; 285/314, 319

[56] References Cited

U.S. PATENT DOCUMENTS

| 34,769 | 3/1862 | Northrup | 403/310 |
|---|---|---|---|
| 258,597 | 3/1981 | Barrett | D19/07 |
| 645,099 | 3/1900 | Homan . | |
| 1,199,690 | 9/1916 | Gillan . | |
| 1,670,654 | 5/1928 | Delaney . | |
| 2,015,559 | 9/1935 | Holm | 24/109 |
| 2,438,313 | 3/1948 | Burton | 287/117 |
| 2,468,849 | 5/1949 | Trainor | 285/314 |
| 2,942,897 | 6/1960 | Eason | 403/317 |
| 2,942,903 | 6/1960 | Giladett | 403/317 |
| 3,230,643 | 1/1966 | Mathus | 35/18 |
| 3,284,926 | 11/1966 | Godfrey | 35/18 |
| 3,333,349 | 8/1967 | Brumlik | 35/18 |
| 3,393,795 | 7/1968 | Covert, Jr. | 206/42 |
| 3,510,962 | 5/1970 | Sato | 35/18 |
| 3,524,267 | 8/1970 | Barrett et al. | 35/18 |
| 4,030,209 | 6/1977 | Dreiding | 35/18 A |
| 4,245,920 | 1/1981 | Barrett | 403/305 |
| 4,348,190 | 9/1982 | Barrett | 434/278 |
| 4,585,369 | 4/1986 | Manesse et al. | 403/317 X |

FOREIGN PATENT DOCUMENTS 419650  8/1974  U.S.S.R. .............. 403/310

OTHER PUBLICATIONS

Article entitled "Biopolymer Models of Nucleic Acids" by Barrett, published in and reprinted from *Journal of Chemical Education*, vol. 56 Mar., 1979, page 168.
Brochure of *Academic Press/Molecular Design Inc.*, entitled "Precision Molecular Models."
Brochure entitled "Assembly Instructions For Polypeptide Models" of Academic Press/Molecular Design Inc., Precision Molecular Models, by Barrett, published by *Academic Press, Inc.*, Orlando, Fla. 1982.
Brochure entitled "General Assembly Instructions" of Academic Press/Molecular Design Inc., Precision Molecular Models, by Barrett, published by *Academic Press, Inc.*, Orlando, Fla. 1982.
Brochure entitled "Assembly Instructions for Nucleic Acid Models" of Academic Press/Molecular Design Inc., Precision Molecular Models, by Barrett, published by *Academic Press, Inc.*, Orlando, Fla. 1982.

Primary Examiner—Randolph A. Reese
Assistant Examiner—Franco Deliguori
Attorney, Agent, or Firm—Kramer, Brufsky & Cifelli

[57] ABSTRACT

Molecular modeling constituents having plug ends are joined by a coupling having a connective sleeve and a locking sleeve. The connective sleeve receives a plug in a bore at each end thereof. Radially deflectable staves of the connective sleeve have ridges on the inside surface thereof for engaging corresponding annular grooves about the circumference of the plugs. A locking sleeve fits over the connective sleeve and allows outward radial deflection of the staves in an OPEN position for insertion/extraction of plugs into/from the coupling, and inhibits radial deflection of the staves in a lock position to prohibit insertion/extraction of plugs into/from the coupling. The OPEN and LOCK positions are relative rotational positions of the connective sleeve and locking sleeve.

7 Claims, 3 Drawing Sheets

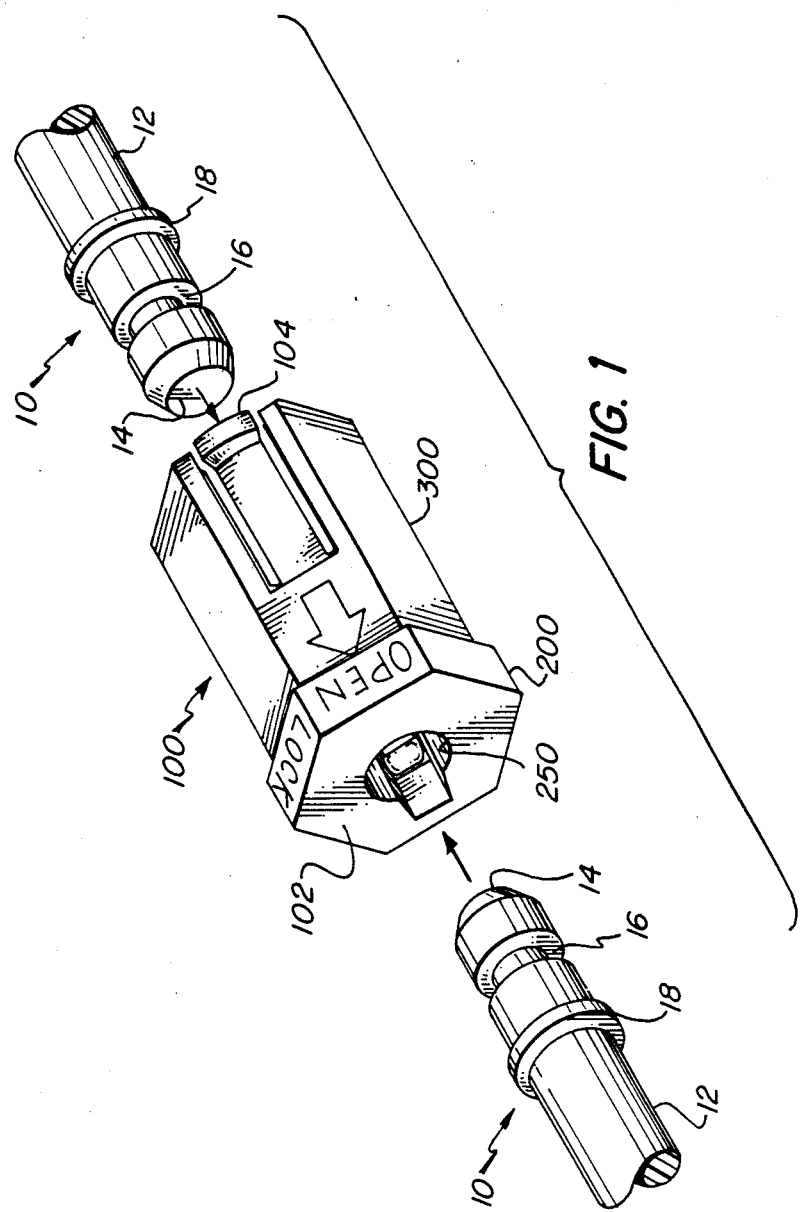

COUPLING FOR MOLECULAR MODELS

FIELD OF THE INVENTION

The present invention relates to a fastener for joining two plugs in coaxial alignment and in a plurality of relative orientations about the axis of alignment. Such fasteners are useful for joining models of molecular constituents to assemble models of complete molecular structures.

BACKGROUND OF THE INVENTION

U.S. Pat. No. 4,245,920, entitled "Interconnectable Molecular Models and a Fastener for Connecting Same" discloses a mechanical fastener for joining two plugs in coaxial alignment and in a plurality of relative orientations. The fastener is particularly adapted for use in joining models of molecular constituents to assemble models of larger molecular structures. Models of molecular constituents are disclosed which incorporate a plug having a generally cylindrical shank extending along an axis corresponding to a chemical bond and at least one tab projecting outwardly from the surface of the shank. Broadly, the fastener comprises a hollow housing which includes a first and a second end wall and a side wall extending between the two end walls. The end walls and the side wall define a cavity within the housing. Each end wall has a plug-receptacle opening passing through it shaped and dimensioned to receive a plug. The surface of each end wall which faces the cavity has a plurality of grooves therein extending radially outwardly from the plug-receptacle opening and spaced apart azimuthally around the opening. The grooves are oriented and configured to accommodate the tab from the plug.

U.S. Pat. No. 4,348,190, entitled "Interlocking Molecular Model System" discloses a molecular model system in which a first component representative of an atom includes at least one elongated shank that has a cylindrical section of one cross-sectional area with an inwardly extending shoulder and an outwardly extending abutment located between the shoulder and the part of the component that represents the nucleus. The molecular model system further includes a fastener component that has a hollow tubular portion longitudinally slotted at one end and having an axial length that represents a predetermined portion of a covalent radius of the atom. The inner surface at one end of the slotted end portion extends inwardly to be hooked behind the shoulder to interlock with the shank.

DISCLOSURE OF THE INVENTION

It is therefore an object of this invention to provide a coupling for molecular models that is easier to use than previous couplings. Such ease of use is demonstrated in that (1) a strong force is not required to engage/disengage the molecular modeling constituents with/from the coupling, and (2) no tools are required to engage/disengage the molecular modeling constituents.

It is a further object of this invention to provide a coupling for molecular models that is easier to make than previous couplings, for instance, that may be made entirely by injection molding.

It is another object of this invention to provide a coupling for molecular models that can be locked to ensure that large molecular structures (models) assembled therewith do not accidently come apart.

It is another object of this invention to provide a coupling for molecular models that can accommodate molecular structures that have strained angles without coming apart.

According to the present invention, molecular modeling constituents having plug ends are joined by a coupling having a connective sleeve and a locking sleeve. The connective sleeve receives a plug in a bore at each end thereof. Radially deflectable staves of the connective sleeve have ridges on the inside surface thereof for engaging corresponding annular grooves about the circumference of the plugs.

According to a feature of the present invention, a locking sleeve fits over the connective sleeve and allows outward radial deflection of the staves in an OPEN position for insertion/extraction of plugs into/from the coupling, and inhibits radial deflection of the staves in a LOCK position to prohibit insertion/extraction of plugs into/from the coupling. The OPEN and LOCK positions are relative rotational positions of the connective sleeve and locking sleeve.

According to an aspect of the present invention, a lip is formed on the exterior of the connective sleeve and a groove is formed on the interior of the locking sleeve to limit the relative rotation of these two elements to the OPEN and LOCK positions.

According to a further aspect of the present invention, the two staves are formed at opposite, dimetrically opposed ends of the connective sleeve.

Other objects, features and advantages of the present invention will become apparent in light of the following description thereof.

BRIEF DESCRIPTION OF THE DRAWINGS

FIG. 1 is a perspective view of the coupling of this invention and the molecular model constituents incorporating plug ends that are joined by the coupling.

FIG. 2A is a cross-sectional view of the connective sleeve, taken through 2A—2A of FIG. 2C.

FIG. 2B is a cross-sectional view of the connective sleeve, taken through 2B—2B of FIG. 2C.

FIG. 2C is an end view of the connective sleeve.

FIG. 2D is a side view of the connective sleeve.

FIG. 3A is an end view of the locking sleeve.

FIG. 3B is a cross-sectional view of the locking sleeve, taken through 3B—3B of FIG. 3A.

FIG. 3C is a cross-sectional view of the locking sleeve, taken through 3C—3C of FIG. 3D.

FIG. 3D is an end view of the locking sleeve, taken opposite the end view of FIG. 3A.

Figure 2A:
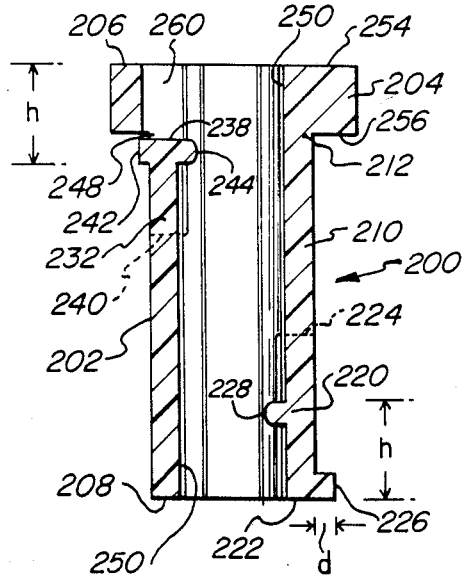
FIGS. 2A-2D show the connective sleeve of the coupling of this invention.

As used herein, the terms "longitudinal", "circumferential", "radial", "inner", "outer", and "axial" refer to directions taken with respect to the generally cylindrical configuration of the connective sleeve 200, as well as the locking sleeve 300, as will be described hereinafter.

DETAILED DESCRIPTION OF THE INVENTION

FIG. 1 shows the coupling 100 of this invention which comprises a connective sleeve 200 and a locking sleeve 300. Further illustrated in FIG. 1 are "plugs" 10 of molecular modeling constituents (not shown). The coupling 100 joins together the plugs 10 of two molecular modeling constituents, by insertion of one plug 10 into each end 102, 104 of the coupling 100. The plugs 10 are formed to insert into and be retained by the fastener 100, in the following manner.

The plugs 10 have a generally cylindrical shank 12 and an end 14 that is inserted into a bore 250 in either end 102, 104 of the coupling 100, as will be described in greater detail hereinafter. The end 14 of the plug 10 is chamfered, as shown, to facilitate entry into the bore 250, which is only slightly larger than the shank 12.

Behind the leading end 14 of the shank 12, an annular groove 16 of decreased diameter is formed about the circumference of the shank 12. This groove 16 is ultimately engaged by a mating ridge (228, 244) within the bore 250 of the coupling 100. These ridges, as will be described hereinafter, are disposed on resilient members (staves 220, 232) formed on the connective sleeve 200 which, when the coupling is in an "OPEN" configuration, as illustrated in FIG. 1, allows for the axial insertion/extraction of a plug 10 from the coupling 100 by deflection of the resilient members (220, 232) and consequent outward radial displacement of the ridges (228, 244). When the coupling is in a "LOCK" configuration, as will be described hereinafter, the resilient members (220, 232) are restrained from outward deflection, as a consequence of which the ridges (228, 244) engaging the grooves 16 prevent the insertion/extraction of a plug 10 from the coupling 100.

Behind the annular grove 16 on the shank 12, an annular lip 18 of increased diameter is formed about the circumference of the shank 12. This lip 18 ultimately limits the extent of axial insertion of a plug 10 into a bore (250, 304) of the coupling by 'stopping" against either end 102, 104 of the coupling 100 which ensures that the bonded atoms are at the correct internuclear distance and/or van der Waal's radius. It is thus evident that the diameter of the annular lip 18 is greater than the diameter of the bore 250 in the coupling 100.

FIGS. 2A through 2D show the connective sleeve 200 of this invention. In the various views, it is evident that the connective sleeve 200 has a generally cylindrical, tubular body member 202, terminating at one end thereof in a flange 204 of greater diameter than the body member 202. It will become more evident hereinafter that the flange 204 acts as a stop when the locking sleeve 300 (shown in FIGS. 1 and 3A–3D) is positioned over the body 202 of the connective sleeve 200. An end surface 206 formed by the flange 204 corresponds to the end 102 of the couplng 100 described in FIG. 1, and an end surface 208 of the body 202 corresponds generally to the end 104 of the coupling 100 described in FIG. 1.

The body member 202 is generally cylindrical, having a wall 210, the aforementioned end surface 208 and an opposite end 212. As best viewed in FIG. 2D, two longitudinal, parallel slits 214, 216 in the wall 210 extend axially from the end surface 208 towards the end 212, approximately half the distance thereto. The slits 214, 216 are spaced apart about the circumference of the wall 210 approximately 60±10 degrees from each other and thus form a longitudinal (axial) finger, or stave 220 in the wall 210 of the sleeve 200 which, similarly, extends axially about halfway from the end surface 208, where it has a "free" end 222, towards the end 212, where it is connected at a point (position) 224 to the body 202.

The connective sleeve 200, as well as the locking sleeve 300, are preferably formed of a tough, resilient polymeric material such as Delrin, an acetal resin, nylon, a polyamide, or Lexan, a polycarbonate. As will be evident hereinafter, the stave 220 is therefore able to deflect radially inwardly and outwardly with respect to the body member 202 by virtue of a "living hinge" formed at the point 224 where it is connected to the body member 202, as well as by virtue of its own inherent resiliency.

Figure 2B:
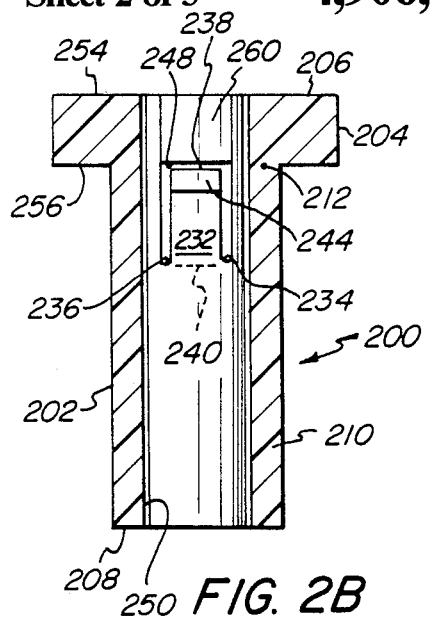
Figure 2C:
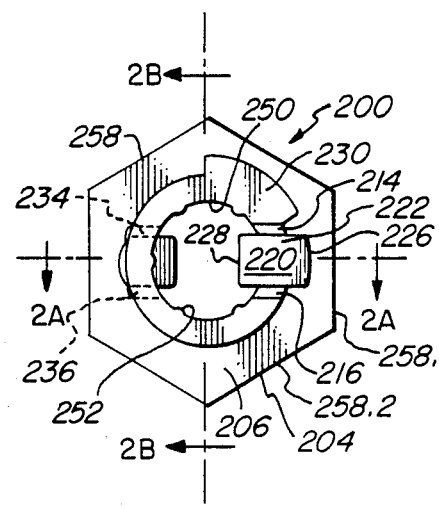
Figure 2D:
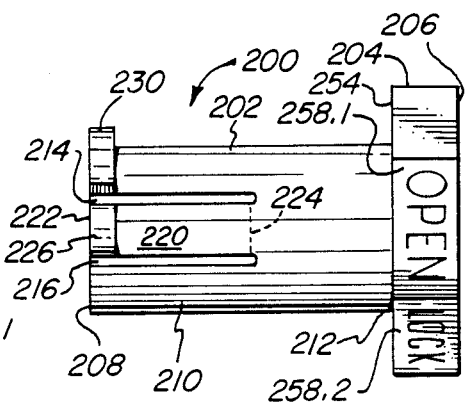

Further features of the stave 220 are evident in FIGS. 2A, 2C and 2D. A lip 226 is formed at the free end 222 of the stave 220 and extends radially outwardly from the stave 220 by a dimension, d, which is on the order of 50–100% of the thickness of the wall 210. The lip 226 extends axially (longitudinally) from the stave end 222 towards the sleeve end 212, a short distance, which is on the order of d/2, and extends circumferentially across the outer surface of the stave 220 at its end 222. The function of the lip 226 will become more apparent in light of the structure of the locking sleeve 300, discussed hereinafter.

Approximately halfway along the longitudinal extent of the stave 220, at a distance, h, from the end 208 of the connective sleeve 200, a ridge 228 is formed which extends radially inwardly from the stave 220, and which extends circumferentially across the inner surface of the stave 220. The shape and size of the ridge 228 are suitable to engage the annular groove 16 of the plug 10, shown in FIG. 1.

With reference to FIGS. 2C and 2D, a lip 230 is formed on the end 208 of the body 202. The lip 230 extends radially outwardly from the body 202 by a distance approximately equal to the dimension, d. The lip 230 extends axially from the end surface 208 towards the end 212, a short distance on the order of d/2. The circumferential extent of the lip 230 is approximately 60°±15°, and it is positioned circumferentially adjacent the slit 214. The function of the lip 230 will become more evident in light of the structure of the locking sleeve 300, discussed hereinafter.

Another stave 232 is formed on the upper portion of the body 202 in the following manner. Two longitudinal, parallel slits 234, 236 in the wall 210 extend from the end 212 of the body member 202, axially, towards the end 208, approximately one-third of the distance thereto. The slits extend entirely through the wall 202 and are spaced apart approximately 60±10 degrees from each other to form the longitudinal stave 232 in the wall 210. This stave 232 has a "free" end 238 and an end forming a resilient connection to the body 202 at a point (position) 240. A lip 242 is formed at the free end 238 of the stave 232 and extends radially outwardly therefrom by approximately d/4. The lip 242 extends axially along the stave 232 towards its connected end 240 a short distance, such as d/2, and extends circumferentially across the outer surface of the stave 232.

On the inside of the stave 232, a ridge 244 is formed which extends radially inwardly from the stave 232, and which extends cirucmferentially across the inner surface of the stave 232. The shape and size of the ridge 244 are substantially identical to the ridge 228, and the ridge 244 is similarly suitable to engage an annular groove 16 of a plug 10. The ridge 244 is disposed a distance, h, from the end 206 of the connective sleeve 200.

As best viewed in FIG. 2A, the stave 232 does not extend axially fully to the end 212 of the body 202. It terminates just short thereof, by 0.005–0.0010 inches for example, in order that there may be a clearance 248 to permit the stave 232 to deflect, in light of the close juxtaposition of the flange 204, which is discussed hereinafter. Furthermore, the stave 232 is diametrically opposed to the stave 220. The function of the lip 242 will become more evident in light of the structure of the locking sleeve 300, discussed hereinafter.

The connective sleeve 200 has a generally cylindrical bore 250, interrupted (reduced in diameter) only by the intrusion of the ridges 228 and 244, which can deflect outwardly as disscussed hereinbefore, and by four axial ridges (splines) 252 disposed on the inner surface of the wall 210. The ridges 252 ensure a good frictional fit of plugs 10 within the connective sleeve 200. It is essential that the bore 250 extend axially into the body member 210 from the two ends 206, 208 thereof for receiving and connecting two plugs 10, but the bore 250 may not necessarily extend entirely through the connective sleeve 200.

The flange 204 is formed in the following manner at the end 212 of, and is coaxial with the body member 202 of the connective sleeve 200. As is immediately apparent from the various views 2A through 2D of the connective member 200, the flange 204 is a disc-like member having a central aperture (hole), the bore 250, therethrough in alignment with the body member 210. The flange has a thickness, or axial extent, and peripheral shape of suitable dimension and configuration for grasping and turning the connective sleeve 200 with respect to the locking sleeve 300 for, as is shown in FIG. 1, when the connective sleeve 200 and locking sleeve 300 are joined together, generally only the flange 204 of the connective sleeve 200 is exposed for manipulation. In the example shown in FIGS. 2A through 2D, the flange 204 has a hexagonal-prismatic shape with a flat end surface 254 forming the extreme end surface 206 of the connective sleeve 200, a flat surface 256 contiguous with the end 212 of the body member 202, and six sides 258.

As is best viewed in FIGS. 2A and 2B, a cutout 260 is provided through the surfaces 254, 256 of the flange extending from the bore 250 approximately halfway to the periphery of the flange 204. The flange 204 is oriented so that the cutout 260 is in circumferential alignment with the stave 232 and is basically a byproduct of the injection molding process used to form the aforementioned slits 234, 236 and stave 232.

In a preferred embodiment of the invention, a suitable legend such as "OPEN" is imprinted or embossed on a particular side 258.1 of the flange 204 that is circumferentially aligned with the stave 220, and the legend "LOCK" (partially visible in FIG. 2D) similarly appears on a side 258.2 of the flange that is adjacent the side 258.1 and away from the lip 230. These sides 258.1, 258.2 are visible in FIG. 1. As will be evident hereinafter, with respect to a corresponding reference mark on the locking sleeve 300, these legends indicate two relative rotational positions of the connective sleeve 200 with respect to the locking sleeve 300 at which plugs 10 can (OPEN) or cannot (LOCK) be inserted or withdrawn from the coupling 100. Equivalently, the locking sleeve could carry the two legends and the connective sleeve could be marked to indicate the OPEN and LOCK positions of the coupling.

FIGS 3A through 3D show the locking sleeve 300 of this invention. In the various views, it is evident that the locking sleeve has a generally cylindrical, tubular body member 302, inasmuch as it has a circular bore 304 extending axially throughout the entire length of the body member 302. However, for purposes of manipulation of this element, its exterior shape is preferably hexagonal in a manner similar to that of the flange 204. An end surface 306 of the locking sleeve 300 abuts the surface 256 of the flange 204 when the locking sleeve 300 is assembled onto the connective sleeve 200. An opposite end surface 308 corresponds to the end surface 104 of the coupling 100 described in FIG. 1.

As implied by its name, the "locking" sleeve 300 acts in concert with the connective sleeve 200 to releasably lock together the plugs 10 of two molecular modeling constituents. As mentioned hereinbefore, the ridges 228, 244 on the staves 220, 232 of the connective sleeves 200 engage the annular grooves 16 of the plugs 10, in a type of snap-fit, due to the resiliency of the staves 220, 232. The locking sleeve 300, in the "OPEN" position allows for such resilient deflection of the staves 220, 232, and in the "LOCK" position restrains resilient deflection of the staves 220, 232.

Figure 3A:
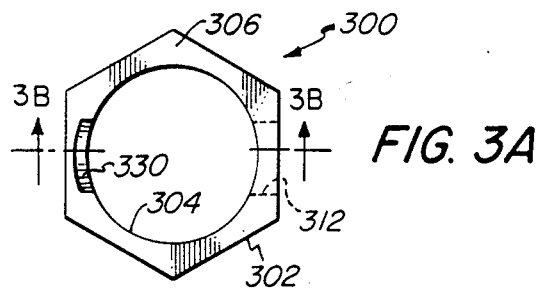
FIGS. 3A-3D show the locking sleeve of the coupling of this invention.
Figure 3B:
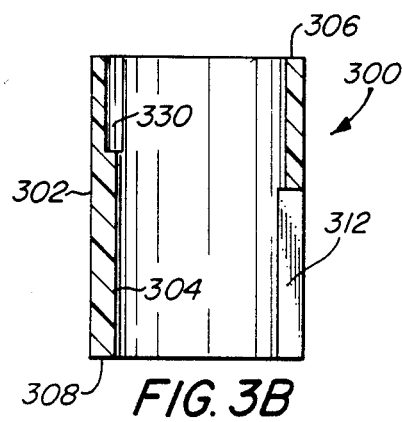
Figure 3C:
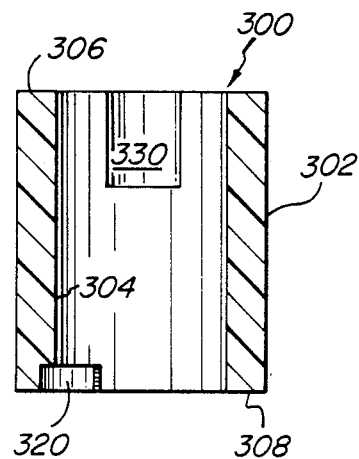
Figure 3D:
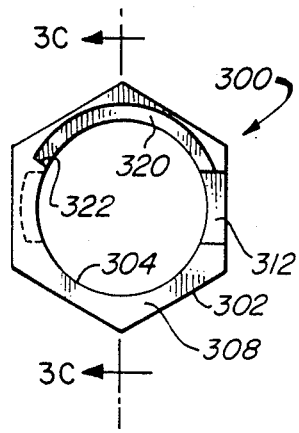

As best viewed in FIGS. 3B and 3D a longitudinal slot 312 extends along the body member 302 of the locking sleeve 300 from the end surface 308 axially towards the end surface 306, approximately 60±10% of the distance thereof. The circumferential extent of the slot 312 around the body member 302 is sufficient to allow for outward radial deflection of the stave 220 in the OPEN position. When the locking sleeve 300 is assembled to the connective sleeve 200, the stave 220 of the connective sleeve 200 is circumferentially aligned with the slot 312 of the locking sleeve 300, and this circumferential alignment of the sleeves 200, 300 represents the "OPEN" position of the fastener 100. To this end, a mark, shown as an arrow in FIG. 1, is imprinted or embossed on the outside surface of the wall 302 in circumferential alignment with the slot 312, the stave 220 (in the "OPEN" position) and the "OPEN" legend on the side 258.1 of the flange 204. Clearly, in the "OPEN" position, the stave 220 is free to deflect outwardly upon insertion of a plunger 10 into the bore 250 of the connective sleeve 200.

As best viewed in FIGS. 3C and 3D, an annular groove 320 is formed around the inside surface of the wall 302 at the end 308 of the locking sleeve 300 in the following manner. The groove 320 extends approximately 120° around the wall 302 from the slot 312 towards the lip 230 of the connective sleeve 200 when assembled. As mentioned hereinbefore, the stave 220 is circumferentially aligned with the slot 312 in the "OPEN" position of the coupling 100. Furthermore, in the "OPEN" position, the lip 230 is circumferentially aligned with a portion (half, or 60°) of the annular groove 320 adjacent the slot 312. When the coupling 100 is rotated to the "LOCK" position, the lip 230 is circumferentially aligned with a portion of the annular groove 320 distant from the slot 312, and the lip 226 on the stave 220 is in circumferential alignment with the portion of the groove 320 adjacent the slot 312. Furthermore, further relative rotation of the locking sleeve 300 past the "LOCK" position is impeded by abutment of the lip 230 against a stop 322 formed in the wall 302 at the extreme end of the annular groove 320.

As best viewed in FIGS. 3A, 3B and 3C, a recess 330 is formed on the inside surface of the wall 302 in the following manner. This recess 330 is sized, shaped and positioned to allow for resilient deflection of the stave 232 in the "OPEN" position. In the "LOCK" position, the wall 302 of the locking sleeve 300 restrains deflection of the stave 232 because the stave 232 is no longer aligned with the recess 330 in the "LOCK" position. Thus, it is evident that the recess 330 is disposed diametrically opposed and at an opposite end of the locking sleeve 300 with respect to the slot 312.

What is claimed is:

1. A coupling for joining molecular modeling constituents, said molecular modeling constituents having plugs including a generally cylindrical shank and an annular groove about the circumference of the shank, said coupling comprising:
   (a) a connective sleeve having:
      a body member having a generally cylindrical wall, two ends, and a bore extending axially into the body member from the two ends for receiving a plug of a molecular modeling constituent;
      a first stave formed in the wall of the body member, said stave including an inwardly extending ridge for mating with an annular groove in the plug; and
      a second stave formed in the wall of the body member; said stave including an inwardly extending ridge for mating with an annular groove in another plug; and
   (b) a locking sleeve having:
      a body member having a bore therethrough forming a generally cylindrical wall, said body member of suitable size to fit coaxially over the connective sleeve;
      first means formed in the wall of the body member for receiving, in circumferential alignment in an "OPEN" position of the coupling, the first stave of the connective sleeve and for allowing the outward radial deflection of the first stave;
      second means formed in the wall of the body member for receiving, in circumferential alignment in an "OPEN" position of the coupling, the second stave of the connective sleeve and for allowing the outward radial deflection of the second stave;
   wherein, in a "LOCK" position of the coupling, the wall of the locking sleeve restricts the outward radial deflection of the first and second staves.

2. A coupling according to claim 1 wherein:
   a lip is formed at one end of the connective sleeve body member;
   a groove is formed at a corresponding end of the locking sleeve body member; and
   the lip and groove limit the rotation of the connective sleeve with respect to the locking sleeve to the OPEN and LOCK positions.

3. A coupling according to claim 2, wherein:
   another lip is formed at an end of the second stave on the connective sleeve body member; and
   both lips limit the rotation of the connective sleeve with respect to the locking sleeve to the OPEN and LOCK positions.

4. A coupling according to claim 1, wherein:
   a first means formed in the wall of the locking sleeve body member is a slot allowing the outward radial deflection of the first stave in the OPEN position.

5. A coupling according to claim 1, wherein:
   the second means formed in the wall of the locking sleeve body member is a recess allowing the outward radial deflection of the second stave in the OPEN position.

6. A coupling according to claim 1, wherein:
   the first means formed in the wall of the locking sleeve body member is a slot allowing the outward radial deflection of the first stave in the OPEN position; and
   the second means formed in the wall of the locking sleeve body member is a recess allowing the outward radial deflection of the second stave in the OPEN position.

7. A coupling according to claim 1, wherein:
   the connective sleeve is imprinted or embossed with the legends "OPEN" and "LOCK";
   the locking sleeve is imprinted or embossed with a mark; and
   in the OPEN position of the coupling the mark aligns circumferentially with the OPEN legend, and in the LOCK position the mark aligns circumferentially with the LOCK legend.

* * * * *